Patented June 27, 1939

2,163,621

UNITED STATES PATENT OFFICE 2,163,621

METHOD OF PREPARING PECTIN

Philip Bliss Myers, Scarsdale, N. Y., assignor to Sardik Incorporated, Jersey City, N. J., a corporation of Delaware No Drawing. Application September 11, 1937, Serial No. 163,388

13 Claims. (Cl. 260—210)

This invention relates to pectin and more particularly to the preparation of pectin from raw material.

The raw material which at the present time constitutes the main source of pectin is either the residue from cider mills known as apple pomace, or the white part of citrus fruits known as albedo. Pectin is extracted by heating the material in acidified water under carefully controlled conditions of time, temperature and hydrogen ion concentration to obtain as large a number of jelly units as possible. The extract so obtained is a liquid dispersion of a fairly high grade pectin which imparts a relatively high viscosity to the extract. Because of the high viscosity it is necessary to add excessive amounts of water during the extraction operation in order to simplify the recovery of the pectin and the clarification of the extract, and this results in an extract having a relatively low pectin concentration, usually from 0.2% to 0.6%.

It is, of course, necessary to recover the pectin from the extract so made. One method of recovery which is very generally used at the present time is to precipitate the pectin by alcohol. However, due to the large volume of alcohol required, this is a costly process and is commercially possible only after concentration of the pectin extract. Because of the fact that pectin deteriorates rapidly at high temperatures, the extract must be concentrated at low temperatures and this requires the use of a costly vacuum evaporation system. At the same time, the alcohol precipitation of pectin from the concentrated extract results in a product containing a high percentage of impurities which are also precipitated by the alcohol and occluded by the voluminous pectin precipitate. While the percentage of these impurities may be reduced by repeated precipitation with alcohol, such a process is not only time consuming and expensive, but also results in loss of jelly units.

The fact that pectin can also be recovered by ionic precipitation has been noted by several investigators. For example, Von Fellenberg (Uber die Konstitution des Pektinkorper, Biochem, Z. 85, 118–161 (1918)) found that certain pectins could be precipitated by adding to the extract such salts as copper sulphate, lead nitrate, basic and neutral lead acetate, and ferric chloride. Von Fellenberg recognized that the pectin molecule contains acid groups or carboxyl groups some of which are methylated. He also found that splitting off the methoxyl groups from the pectin molecule made more carboxyl groups available for combination with metallic ions and rendered easier the precipitation of pectin therewith. However, it should be noted that Von Fellenberg had only pectin of a relatively low jelly grade to work with.

Within recent years much has been added to our knowledge of pectin and the process of extracting pectin from raw materials has been greatly improved, so that pectin can now be extracted under carefully controlled conditions which minimize its destruction and result in high yields of high grade pectin. The processes employed, however, do not liberate sufficient carboxyl groups in the pectin molecule by splitting off methoxyl groups therefrom to provide a pectin which can be easily precipitated by most metallic ions. Until comparatively recently no method was successful for splitting off these methoxyl groups to render the pectin precipitatable by metallic ions without also lowering the jelly grade of the pectin beyond any feasible point. The art was first shown how to do this by work done at the University of Delaware Agricultural Experiment Station and described in the Station Bulletins 168 of 1931 and 187 of 1934, namely, by extracting at a comparatively low temperature and low pH for a long period of time. By such a process a high grade pectin is obtained which has sufficient carboxyl groups available to permit precipitation of high grade pectin by metallic ions.

Inasmuch as ionic precipitation of pectin produces a metallic pectinate, that is to say, a pectin precipitate having metallic ions combined with the pectin, it is necessary to remove the metal from the pectin precipitate in order to obtain a pure product. This can be done in a number of different ways, but most satisfactorily by washing the precipitate in acidified alcohol. The precipitated metallic pectinate must, however, be dried prior to such washing due to the fact that considerable loss of grade will result if the undried precipitate is washed in alcohol. Also, the drying operation, particularly when conducted at atmospheric pressure, causes such deterioration in the jelly grade of the pectin as to render the entire process commercially impractical, unless it is carried on by means of a costly vacuum system. However, even with such systems the drying operation causes some deterioration in the jelly grade of the pectin.

An object of this invention is to provide an improved method of obtaining high grade pectin from raw material.

A further object is to provide a method of preparing pectin from raw material by ionic precipitation of such character as to permit subsequent drying of the pectin precipitate substantially without loss of jelly grade.

These and other objects which will be apparent to those skilled in the art are attained by means of the present invention, a preferred embodiment of which is hereinafter described.

In the present invention pectin which has been extracted from any suitable raw material in any way desired is precipitated from either the concentrated or unconcentrated extract by adding to the extract a metallic salt which will not only unite with the pectin molecule to cause precipitation, but will also produce a pectin precipitate capable of being dried at atmospheric pressure substantially without loss of jelly grade.

I have found that the purposes of the present invention can be accomplished by employing various nickel salts to precipitate the pectin. For example, substantially any soluble salt of nickel can be used such as nickel sulphate, nickel ammonium sulphate, nickel chloride and the like. Such so-called insoluble salts as nickel carbonate or nickel hydroxide can also be used and I prefer to use nickel carbonate as it simplifies the recovery of the excess nickel from the filtrate as hereinafter brought out, as well as neutralizing the excessive acidity of the pectin extract so that little or no additional alkali is needed for this purpose. If a soluble salt of nickel is used, such as the sulphate or chloride, the excessive acidity of the extract must be partially neutralized with a suitable alkali, or the salt of a strong base and a weak acid, or the carbonates or bicarbonates of the alkali or alkaline earth metals.

Although it will be found that nickel salts will precipitate pectin from a liquid extract thereof even when the pectin has not been treated to reduce its methoxyl content, only about 60% of such pectin will be precipitated. In order to precipitate all the pectin present, it is advisable to subject it, either in the extracting operation or at some other time to the treatment described in the above mentioned University of Delaware Bulletins, for the purpose of reducing its methoxyl content and rendering all the pectin precipitatable by the nickel.

In carrying out the present invention, assuming the methoxyl content of the pectin has been reduced by such a treatment as that referred to, the nickel salt is added to the extract while it is vigorously agitated and heated to a temperature of not more than 60° C., and preferably to about 40° C. During agitation sufficient alkali is added to adjust the pH to approximately 3.5 to 4.5 depending upon the salt used. The exact amount of alkali required for this purpose may vary in each case depending upon the pH of the original extract. The amount needed can be determined in each case by simple tests well known in the art. I preferably use sodium bicarbonate or sodium carbonate, but ammonia or the other alkalis above mentioned can be used.

The solution is agitated vigorously during the addition of the salts, and finally let stand for about one-half hour. The nickel-pectin precipitate rises immediately in a curd to the surface and is easily separated from the liquid. It is in the form of a nickel-pectin salt which may be termed nickel pectinate, in which the nickel has taken the place of the hydrogen ions in a sufficient number of the free carboxyl groups of the pectin molecule to produce the precipitation. The precipitate is filtered out by any known method, then washed and dried.

As an illustration of one embodiment of the invention, I have acidified clear pectin extract with hydrochloric acid to a pH of 1.3, and maintained it at 40° C. for a period of approximately 24 hours. This serves to reduce the methoxyl content of the pectin to a point where substantially all the pectin can be precipitated by nickel salts.

For example, to 200 pounds of such extract, containing approximately .9 pound pectin, add 1.6 pounds of nickel sulphate, $NiSO_4.6H_2O$, and neutralize the mixture to a pH of approximately 4.26 by adding approximately 1.27 pounds of sodium bicarbonate. Substantially all the pectin will be precipitated in the form of a nickel-pectinate which can be filtered out, washed and dried.

In another embodiment I have used nickel carbonate, $NiCO_3$, having approximately 42.14% nickel present, by adding to about 100 pounds of pectin extract containing approximately .3 pound pectin, approximately 0.2373 pound of nickel carbonate, $NiCO_3$ having approximately 0.1 pound nickel. This mixture was neutralized with sodium bicarbonate to a pH of approximately 3.75. The nickel-pectin precipitate was separated out, washed and dried.

I have also added 0.3164 pound of nickel carbonate containing approximately 0.133 pound nickel to 100 pounds of extract containing approximately .4 pound of pectin. This mixture was neutralized to a pH of approximately 3.75 by adding 0.254 pound of sodium bicarbonate and the nickel pectin precipitate was separated out, washed and dried.

Except for the difference in the salt used, the process using nickel carbonate is similar to the process using nickel sulphate, although when the carbonate is used it will be found that little or no alkali such as sodium bicarbonate is necessary in order to adjust the solution to the proper pH. Also, it will only be necessary to adjust the pH of the solution to approximately 3.75 when nickel carbonate is employed.

Due to the fact that excessive amounts of nickel are required to obtain the desired precipitation, it is commercially necessary to recover the excess nickel from the filtrate. A simple and inexpensive method of so doing is to precipitate the nickel in the form of nickel carbonate by adding sodium carbonate to the filtrate. The nickel carbonate can then be filtered off and used in subsequent pectin precipitating operations. For this reason I prefer to precipitate the pectin with nickel carbonate rather than some other nickel salt, as it eliminates the necessity of converting the nickel carbonate, subsequently recovered from the filtrate, into such other nickel salt to adapt it for use again. Also, as above pointed out, the nickel carbonate neutralizes the excessive acidity of the pectin extract so that little or no additional alkali is required for this purpose.

When nickel salts are employed to precipitate pectin, it will be found possible to dry the resulting precipitate at atmospheric pressure on a heated drying surface without causing any substantial deterioration in the jelly grade of the pectin, and the drying operation can be made continuous by drying on the outer face of an interiorly heated rotating drying drum. The precipitate can be continuously fed to the rotating drum, dried thereon and then removed therefrom by any suitable scraper, such as a steel blade pressed against the drum face.

The temperature and time of drying are variable to some extent ranging from a drying period of about 25 seconds on a drum having a surface temperature of about 99° C. to a period of about 5 seconds on a drum having a surface temperature of about 121° C. I have so far obtained the best results by drying the precipitate for about 12 seconds on a drum having a surface temperature ranging from about 104° C. to 115° C. The dry nickel-pectin precipitate is removed from the drum in the form of a substantially continuous film by the scraper.

If desired, the precipitate can be dried in any other way such, for example, as by heating in a vacuum drier to not over 60° C.

The dry nickel-pectin precipitate is then ground and leached in an 85% alcohol bath containing sufficient acid such, for example, as 6% to 16% concentrated hydrochloric acid, for approximately 30 minutes to remove the nickel therefrom. The pure pectin can then be dried and packaged in powdered form; it can be dispersed in water and bottled as a pure pectin concentrate; or the liquid dispersion can be dried in the manner described in Cowgill U. S. Patent No. 1,973,613 to obtain the dry pectin in the more easily dispersible form of a film. When the dry precipitate is in film form it need not be ground, but the film as such can be subjected to the leaching operation.

The pectin product is then pressed to remove as much alcohol as possible and any remaining alcohol can be removed in a suitable drier such as a rotary vacuum drier having a temperature of not more than 60° C.

The result is a pure pectin of high jelly grade. When in film form, as pointed out in Cowgill Patent No. 1,973,613, it is more readily dispersible than in powder form. If still greater dispersibility is desired the pectin can be treated in the manner set forth in my co-pending application Serial No. 41,255, filed September 19, 1935.

When the nickel-pectin precipitate obtained by the present process is leached in an alcohol bath, such as above described, but containing from 6% to 8% concentrated hydrochloric acid, not all of the nickel will be leached out, but there will be produced a pectin product corresponding to that described in my application Serial No. 41,255 which is readily dispersible in water, fruit juices and the like.

It will be apparent that the present invention can be variously modified and adapted within the scope of the appended claims.

I claim:

1. The method of preparing pectin from raw material which consists in forming a liquid extract of pectin and precipitating the pectin from the extract by adding thereto a nickel salt, and adjusting the reaction to a pH of approximately 3.5 to 4.5.

2. The method of preparing pectin from raw material which consists in forming a liquid extract of pectin and precipitating the pectin from the extract by adding thereto a nickel salt taken from the group consisting of nickel sulphate, nickel ammonium sulphate, nickel chloride, nickel hydroxide and nickel carbonate, and adjusting the reaction to a pH of approximately 3.5 to 4.5.

3. The method of preparing pectin from raw material which consists in forming a liquid extract of pectin, precipitating the pectin from the extract by adding a nickel salt thereto, adjusting the reaction to a pH of approximately 3.5 to 4.5, and separating the nickel pectin precipitate therefrom.

4. The method of preparing pectin from raw material which consists in forming a liquid extract of pectin, precipitating the pectin from the extract by adding a nickel salt thereto, adjusting the reaction to a pH value of approximately 3.5 to 4.5, separating the nickel-pectin precipitate therefrom, and drying the precipitate.

5. The method of preparing pectin from raw material which consists in forming a liquid extract of pectin, precipitating the pectin from the extract by adding a nickel salt thereto, adjusting the reaction to a pH of approximately 3.5 to 4.5, separating the nickel-pectin precipitate therefrom, drying the precipitate, and removing the nickel from said precipitate.

6. The method of preparing pectin from raw material which consists in forming a liquid extract of pectin, precipitating the pectin from the extract by adding a nickel salt thereto, adjusting the reaction to a pH of approximately 3.5 to 4.5, separating the nickel-pectin precipitate therefrom, drying the precipitate, and removing the nickel from said precipitate by leaching in an acid-containing alcohol bath.

7. The method of preparing pectin from raw material which consists in forming a liquid extract of pectin, precipitating the pectin from the extract by adding a nickel salt thereto, adding sodium bicarbonate in an amount sufficient to adjust the reaction of the solution to a pH of approximately 3.5 to 4.5, separating the nickel pectin precipitate therefrom, drying said precipitate, and removing the nickel therefrom.

8. The method of preparing pectin from raw material which consists in forming a liquid extract of pectin, precipitating the pectin from the extract by adding a nickel salt thereto, adding sodium bicarbonate in an amount sufficient to adjust the reaction of the solution to a pH of approximately 3.5 to 4.5, separating the nickel-pectin precipitate therefrom, drying said precipitate, and removing the nickel therefrom by leaching in an alcohol bath containing not more than 16% hydrochloric acid.

9. The method of preparing a pectin product from raw material which consists in forming a liquid extract of pectin, precipitating the pectin from the extract by adding a nickel salt thereto, adding sodium bicarbonate in an amount sufficient to adjust the reaction of the solution to a pH of approximately 3.5 to 4.5, separating the nickel-pectin precipitate therefrom, drying said precipitate, and removing a part of the nickel therefrom by leaching in an alcohol bath containing from 6% to 8% hydrochloric acid.

10. The method of preparing pectin from raw material which consists in forming a liquid extract of pectin, adding nickel carbonate thereto in an amount sufficient to precipitate the pectin in the form of a nickel-pectin precipitate, adding sodium bicarbonate in an amount sufficient to adjust the reaction of the solution to a pH of approximately 3.5 to 4.5, separating the nickel-pectin precipitate therefrom, and drying said precipitate.

11. The method of preparing pectin from raw material which consists in forming a liquid extract of pectin, adding nickel carbonate thereto in an amount sufficient to precipitate the pectin in the form of a nickel-pectin precipitate, adding sodium bicarbonate in an amount sufficient to adjust the reaction of the solution to a pH of approximately 3.5 to 4.5, separating the nickel-pectin precipitate therefrom, drying said precipitate and removing the nickel therefrom by leaching in an acid-containing alcohol bath.

12. The method of preparing pectin from raw material which consists in forming a liquid extract of pectin, adding nickel carbonate thereto sufficient to precipitate the pectin in the form of a nickel-pectin precipitate, adding sodium bicarbonate in an amount sufficient to adjust the reaction to a pH of approximately 3.5 to 4.5, separating the nickel pectin precipitate therefrom, distributing said precipitate over a drying surface in the form of a continuous film, drying the precipitate thereon, removing the dry precipitate therefrom, and removing the nickel from said precipitate by leaching in an acid-containing alcohol bath.

13. The method of preparing pectin from raw material which consists in forming a liquid extract of pectin, adding nickel carbonate thereto sufficient to precipitate the pectin in the form of a nickel-pectin precipitate, adjusting the pH of the solution to approximately 3.5 to 4.5, separating the nickel-pectin precipitate therefrom, drying said precipitate, and removing a portion of the nickel therefrom by leaching in an alcohol bath containing approximately 6% to 8% hydrochloric acid.

PHILIP BLISS MYERS.